Figure 1:
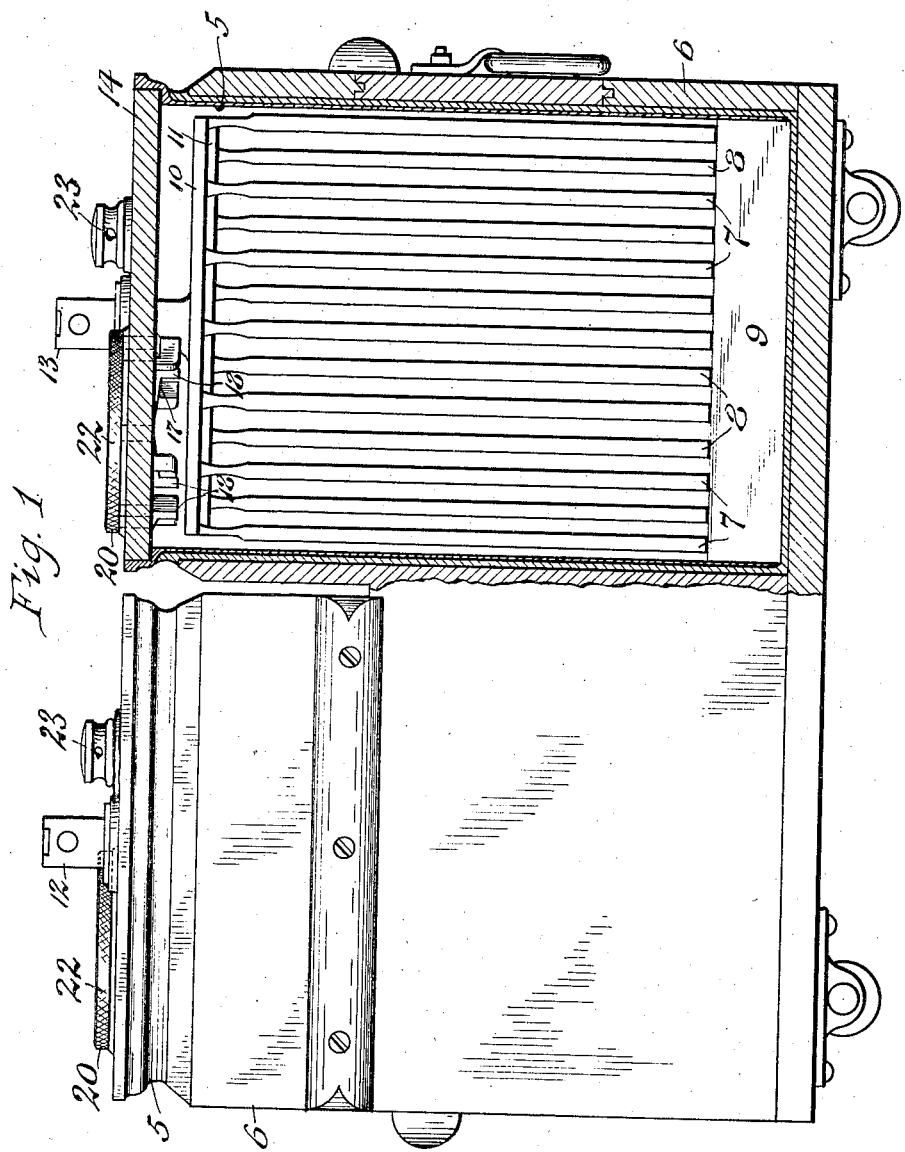

R. N. CHAMBERLAIN.
SAFETY DEVICE FOR STORAGE BATTERIES.
APPLICATION FILED FEB. 24, 1919.

1,387,350.

Patented Aug. 9, 1921.
2 SHEETS—SHEET 1.

Inventor
Rufus N. Chamberlain
By Luner & Popp
Attorneys

R. N. CHAMBERLAIN.
SAFETY DEVICE FOR STORAGE BATTERIES.
APPLICATION FILED FEB. 24, 1919.
1,387,350.
Patented Aug. 9, 1921.
2 SHEETS—SHEET 2.
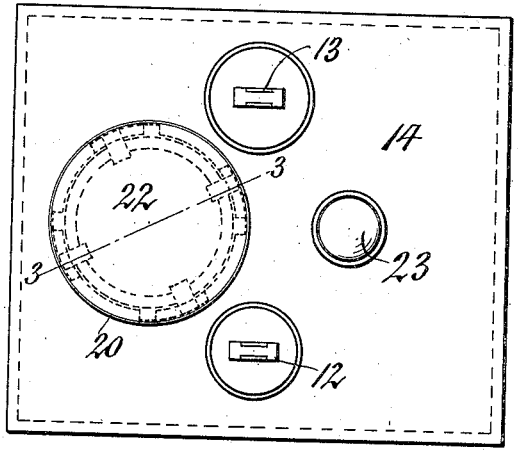
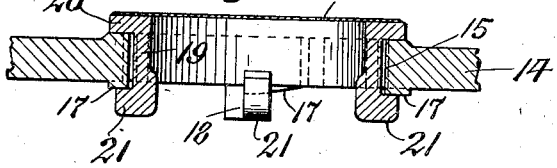
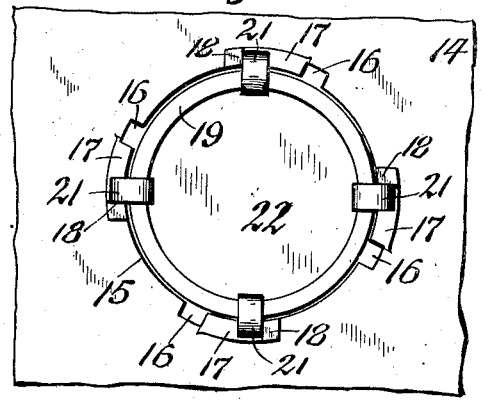
Inventor
Rufus N. Chamberlain
By Geiser + Pople
Attorneys

UNITED STATES PATENT OFFICE.

RUFUS N. CHAMBERLAIN, OF CHICAGO, ILLINOIS, ASSIGNOR TO GOULD STORAGE BATTERY CO., OF DEPEW, NEW YORK, A CORPORATION OF NEW YORK.

SAFETY DEVICE FOR STORAGE BATTERIES.

1,387,350.                Specification of Letters Patent.        Patented Aug. 9, 1921.

Application filed February 24, 1919. Serial No. 278,592.

*To all whom it may concern:*

Be it known that I, RUFUS N. CHAMBERLAIN, a citizen of the United States, residing in Chicago, in the county of Cook and State of Illinois, have invented new and useful Improvements in Safety Devices for Storage Batteries, of which the following is a specification.

This invention relates to a safety device for storage batteries and more particularly for batteries having large units which are employed for lighting trains or similar installations where a comparatively large capacity is required.

As is well known an explosive gas is generated during the operation of the storage battery, particularly when the current continues to flow into the battery after the same has been fully charged which operates to decompose the electrolyte into its constituent elements of hydrogen and oxygen. When bringing a flame near to the storage battery which has given off hydrogen and oxygen an accumulated body of the same is liable to be ignited and explode, causing destruction of the battery and adjacent property and also loss of life. The destructive effect of this gas is mainly due to the fact that the same is confined when ignited in a practically closed space within the upper part of the battery tank, jar or receptacle. If the tops of such tanks were open and the gases liberated from the electrolyte were free to escape to the outer atmosphere such destructive explosions would not be liable to occur, but it is necessary to practically close the tops or upper ends of such tanks in order to protect the elements and electrolyte therein from tampering, injury and contamination and for this reason a cover is usually placed over the top of a storage battery tank or jar which is affixed thereto by sealing, fusing or otherwise, so that the interior of the battery is not ordinarily accessible and only a small opening is provided through which water may be supplied to the electrolyte to make up for loss by evaporation and also permit slow escape of any gas which is developed by electrolytic decomposition.

It is the object of this invention to provide simple, efficient and inexpensive means whereby the accidental explosion of the gas within a storage battery tank, jar or receptacle is prevented from wrecking the entire battery as well as avoiding damage to adjacent property and injury to persons in the immediate vicinity.

In the accompanying drawings:

Figure 1 is a sectional elevation of a pair of storage battery cells which ordinarily form a unit for lighting railway trains and for similar purposes, which cells are equipped with my invention. Fig. 2 is a top plan view of one of the cells containing my improvements. Fig. 3 is a fragmentary vertical section, on an enlarged scale, taken on line 3—3, Fig. 2. Fig. 4 is a bottom view of the cover of the battery storage tank and the safety closure applied thereto in accordance with my invention.

Similar characters of reference refer to like parts throughout the several views.

My invention is applicable to various forms of storage batteries, that shown in the drawings being typical of one in which the same may be employed to advantage and as there shown this battery comprises a tank, jar or receptacle 5 of lead which is open at its upper end and inclosed in a chest or box 6 of wood or similar material.

Within this tank are arranged the positive and negative elements 7, 8 which in this case are represented in the form of two sets of plates which alternate with each other and are immersed in the electrolyte contained within the tank. The lower ends of these plates rest upon bridges 9 while the upper ends of the two sets of plates are connected respectively by two straps 10, 11 which are provided with the usual terminals 12, 13. The latter project upwardly through a cover 14 which closes the upper end or top of the tank. This cover may be secured to the upper end of the tank so that the same is normally permanently connected therewith, this connection being effected either by soldering, fusing or sealing with cement. On any suitable part of the cover the same is provided with a vent 23 through which the gas due to electrolytic decomposition may escape from the space within the upper part of the tank and water may also be introduced into the same to make up for loss due to evaporation of the electrolyte.

The cover of the tank is constructed of comparatively strong heavy material such as antimonial lead, so as to withstand the ordinary usage of the battery. On this cover is arranged the safety device which embodies my invention, and which is designed to permit the gases within the upper part of the tank to explode without liability of entirely destroying the tank or injuring adjacent property or persons. The particular embodiment of my invention as shown in the drawings is constructed as follows:

15 represents a comparatively large safety opening or passage formed in the cover of the tank, the same being preferably so disposed that it does not interfere with the ordinary location of the terminals of the battery, this opening being of comparatively large capacity relatively to the space within the tank. In its edge this opening is provided with one or more vertical notches or recesses 16, preferably four, which are arranged equidistant around this opening as shown in Fig. 4. On its under side this cover is provided with a plurality of inclines or cams 17 each of which extends from one lateral side of one of the notches circumferentially toward the next notch and terminates in a downwardly projecting stop or shoulder 18 at the highest part of this inclined surface.

19 represents a supporting ring or annular body of antimonial lead or other material which enters the safety opening of the tank cover and is provided at its upper end with an external annular flange 20 which engages the upper side of the cover, as best shown in Fig. 3. At its lower edge this ring is provided with a plurality of laterally projecting locking lugs or hooks 21, preferably four in number, each of which is adapted to pass vertically through one of the notches in the edge of the safety opening and to engage its upper side with the adjacent inclined surface 17 and one of its lateral sides with the adjacent stop or shoulder 18 on this incline. Extending across the upper edge of the ring is a diaphragm 22 of thin or weak material preferably of an acid resisting character which is secured to this ring so as to cover the space within the latter and form with the same a closure for the safety opening in the tank cover. This closure is applied to the cover for sealing the safety opening therein by lowering the ring through this opening while the locking lugs are in line with the notches, the parts being so proportioned that when the flange of the ring engages with the upper side of the tank cover the locking lugs are arranged below the underside of the cover. Upon now turning the ring and associated parts so that the locking lugs engage with the respective inclined surfaces, this ring will be drawn with its flange tightly downward against the cover and form a practically tight joint therebetween. The turning movement of the closure ring is prevented by the stops or shoulders of the high parts of the inclines which are engaged by the locking lugs, thereby preventing undue tightening of the closure over the safety opening in the cover.

The diaphragm of the safety closure is very weak compared with the strength of the tank cover. If therefore the combustible gas which has accumulated within the upper part of tank should become ignited by the entrance of a flame from any source through the vent or elsewhere the force of the resulting explosion will rupture the weak diaphragm which offers comparatively little resistance and can be easily torn and blown out so as to permit free escape for the expanding gases within the tank. This diaphragm is preferably constructed of a thin sheet of lead or similar material so that the same will merely tear apart sufficiently to afford relief to the gas pressure within the tank without, however, becoming disintegrated or flying into pieces which would be liable to injure adjacent persons or property. The area of the passageway through the ring of the safety closure is preferably made of the largest dimensions possible within the practical limits of the available area of the cover so that a weak and easily rupturable diaphragm of maximum area may be employed and thus provide a free and easy escape of the exploding gases which operates to save the battery as a whole from destruction and also avoids endangering adjacent property and persons which otherwise would occur if the gas exploded in a closed compartment having comparatively strong walls.

Obviously the diaphragm or closure might be otherwise supported so that it is merely displaced to uncover the gas passage when an explosion occurs without actually destroying or rupturing the diaphragm or closure.

When the diaphragm of a safety closure is thus ruptured by an internal explosion of gas within the battery the latter can be quickly restored to its normal condition by removing the supporting ring containing the ruptured diaphragm and replacing the same by a new ring having an unruptured diaphragm, thereby permitting the use of the battery to be resumed without undue interruption. In practice a supply of complete safety closures may be kept on hand for use in an emergency so that the same will be readily available for replacing safety closures which have been ruptured or blown out by the accidental ignition of gases in the battery.

Inasmuch as these safety closures can be produced at comparatively small cost, a very great saving in the maintenance of the storage batteries, particularly of the larger types, may be effected inasmuch as the cost of these closures is a mere trifle compared with the cost of replacing an entire storage battery when the same has been blown to pieces by an explosion of the gases therein.

Furthermore, the protection against violent explosions of the battery avoids the loss of time in effecting a replacement of the same and positively insures the safety of adjacent property and eliminates danger to persons who are accustomed to inspecting the batteries or parts adjacent to the same, particularly in railway service in which inspectors examining the parts of trains or railway cars employ a lighted torch which frequently is brought into close proximity to the vent of the storage batteries forming part of the train lighting system.

I claim as my invention:

1. A storage battery having its tank provided with a safety passage of comparatively large area relative to the closure area of the tank, and a member normally obstructing said passage and adapted to be ruptured by an explosion of gas within the tank.

2. A storage battery including a tank or jar, a cover of comparatively strong material secured to the upper end of said tank or jar and having an opening of comparatively large area relative to the closure area of the tank, and a closure for said opening having a ring which is detachably secured to said cover in the opening thereof and a diaphragm of comparatively weak material secured across said ring and adapted to be ruptured by internal pressure within the tank.

3. A storage battery including a tank or jar, a cover of comparatively strong material secured to the upper end of said tank or jar and having an opening of comparatively large area relative to the closure area of the tank, and a plurality of notches in the edge of said opening, and a closure for said opening comprising a ring engaging with said opening, a plurality of locking lugs projecting laterally from the lower part of said ring and adapted to pass vertically through said notches and horizontally underneath the cover, and a diaphragm of comparatively weak material secured to the upper part of said ring.

4. A storage battery including a tank or jar, a cover of comparatively strong material secured to the upper end of said tank or jar and having an opening of comparatively large area relative to the closure area of the tank, and a plurality of notches in the edge of said opening, and a closure for said opening comprising a ring engaging with said opening, a plurality of locking lugs projecting laterally from the lower part of said ring and adapted to pass vertically through said notches and horizontally underneath the cover, and a diaphragm of comparatively weak material secured to the upper part of said ring, the upper part of said ring being provided with an external annular flange which engages with the top of said cover and the underside of said cover being provided with inclines which are engaged by said locking lugs.

5. A storage battery including a tank or jar, a cover of comparatively strong material secured to the upper end of said tank or jar and having an opening of comparatively large area relative to the closure area of the tank, and a plurality of notches in the edge of said opening, and a closure for said opening comprising a ring engaging with said opening, a plurality of locking lugs projecting laterally from the lower part of said ring and adapted to pass vertically through said notches and horizontally underneath the cover, and a diaphragm of comparatively weak material secured to the upper part of said ring, the upper part of said ring being provided with an external annular flange which engages with the top of said cover and the under side of said cover being provided adjacent to said opening with inclines which are engaged by the upper sides of said lugs and with stop shoulders on the high parts of said inclines for engaging with the sides of said lugs and limiting the tightening movement of the same.

6. A storage battery having its tank provided with a safety passage of comparatively large area relative to the closed area of the tank, and a member normally closing said passage and adapted to be displaced by an explosion of the gas within the tank.

RUFUS N. CHAMBERLAIN.